(12) United States Patent
Gramann et al.

(10) Patent No.: US 11,186,164 B2
(45) Date of Patent: Nov. 30, 2021

(54) THERMAL MANAGEMENT SYSTEM FOR AN ELECTRIC DRIVE SYSTEM, PREFERABLY FOR A VEHICLE

(71) Applicant: Schaeffler Technologies AG & Co. KG, Herzogenaurach (DE)

(72) Inventors: Matthias Gramann, Renchen (DE); Jochen Reith, Bühl (DE); Juergen Faber, Ottersweier (DE); Nicolai Gramann, Renchen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 605 days.

(21) Appl. No.: 16/063,093

(22) PCT Filed: Nov. 30, 2016

(86) PCT No.: PCT/DE2016/200565
§ 371 (c)(1),
(2) Date: Jun. 15, 2018

(87) PCT Pub. No.: WO2017/101935
PCT Pub. Date: Jun. 22, 2017

(65) Prior Publication Data
US 2020/0276899 A1    Sep. 3, 2020

(30) Foreign Application Priority Data
Dec. 17, 2015    (DE) .................... 10 2015 225 644.8

(51) Int. Cl.
*B60K 11/02*    (2006.01)
*B60K 1/00*    (2006.01)
(52) U.S. Cl.
CPC .............. *B60K 11/02* (2013.01); *B60K 1/00* (2013.01); *B60K 2001/003* (2013.01)

(58) Field of Classification Search
CPC ........ B60K 2001/003; B60K 2001/006; B60K 11/02; B60K 11/04; B60W 10/30
See application file for complete search history.

(56) References Cited

U.S. PATENT DOCUMENTS 6,467,286 B2 * 10/2002 Hasebe ............... H01M 10/667
62/185
6,595,433 B2 * 7/2003 Ap .................... H01M 8/04007
237/12.3 B (Continued)

FOREIGN PATENT DOCUMENTS

AT          512123        5/2013
CN      101296829 A      10/2008

(Continued)

*Primary Examiner* — Jeffrey J Restifo
(74) *Attorney, Agent, or Firm* — Davidson, Davidson & Kappel, LLC

(57) ABSTRACT

A thermal management system for an electric drive system, preferably for a vehicle, includes an electric drive including an electric motor and power electronics. The electric motor and the power electronics are integrated in a cooling circuit and are cooled by a coolant circulating in the cooling circuit. The coolant is circulated by a coolant pump. In the case of a variable thermal management system, the electric motor and the power electronics are in spatial contact with respective cooling units. The cooling units of the electric motor and of the power electronics are arranged parallel to each other and an electrically controlled coolant distributor is positioned between the coolant pump and the cooling units which coolant distributor has two outlets. One outlet leads to the cooling unit of the electric motor and one outlet leads to the cooling unit of the power electronics and the outlets of the cooling units are merged into a channel and led back to the coolant pump.

15 Claims, 3 Drawing Sheets

(56) References Cited

U.S. PATENT DOCUMENTS

| | | | |
|---|---|---|---|
| 8,151,917 | B2 | 4/2012 | Suzuki |
| 8,534,402 | B2 * | 9/2013 | Seccardini ............. B60K 11/04 180/68.4 |
| 8,725,365 | B2 | 5/2014 | MacMillian et al. |
| 9,321,325 | B2 * | 4/2016 | Zhang .................... B60H 1/143 |
| 9,511,660 | B2 | 12/2016 | Braun et al. |
| 9,649,909 | B2 * | 5/2017 | Enomoto ............. B60W 20/00 |
| 9,650,940 | B2 * | 5/2017 | Kakehashi ......... B60H 1/32284 |
| 9,744,827 | B2 * | 8/2017 | Nishikawa ................ F01P 9/00 |
| 10,232,702 | B2 * | 3/2019 | Nishikawa ............. B60K 11/04 |
| 10,259,286 | B2 * | 4/2019 | Janier .................... B60K 11/02 |
| 10,611,210 | B2 * | 4/2020 | Schedel ............. B60H 1/32281 |
| 10,688,847 | B2 * | 6/2020 | Kim .................. B60H 1/00899 |
| 10,814,716 | B2 * | 10/2020 | Eberspach ............. B60H 1/004 |
| 10,829,005 | B2 * | 11/2020 | Onozawa ............ H01M 10/625 |
| 10,836,233 | B2 * | 11/2020 | Allgaeuer ............. B60H 1/004 |
| 10,837,348 | B2 * | 11/2020 | Enomoto ............. F01P 11/029 |
| 10,843,528 | B2 * | 11/2020 | Tan .................... B60H 1/00321 |
| 10,843,550 | B2 * | 11/2020 | Wong ....................... B60L 1/003 |
| 10,875,382 | B2 * | 12/2020 | Ben Ahmed ...... B60H 1/00899 |
| 10,954,846 | B2 * | 3/2021 | Han .......................... F01P 3/20 |
| 2008/0217080 | A1 | 9/2008 | Maier et al. |
| 2009/0139686 | A1 | 5/2009 | Suzuki |
| 2013/0151051 | A1 | 6/2013 | Inamura et al. |
| 2013/0199225 | A1 | 8/2013 | Lee et al. |
| 2013/0253784 | A1 | 9/2013 | MacMillian et al. |
| 2013/0285485 | A1 | 10/2013 | Song et al. |
| 2014/0020415 | A1 * | 1/2014 | Heyl ...................... B60K 11/02 62/119 |
| 2015/0129161 | A1 | 5/2015 | Nishikawa et al. |
| 2015/0204220 | A1 | 7/2015 | Cook et al. |

FOREIGN PATENT DOCUMENTS

| | | |
|---|---|---|
| CN | 103151972 A | 6/2013 |
| CN | 103210229 A | 7/2013 |
| CN | 103245008 A | 8/2013 |
| CN | 104057779 | 9/2014 |
| CN | 104309469 A | 1/2015 |
| CN | 104379895 A | 2/2015 |
| CN | 104669998 A | 6/2015 |
| CN | 104791071 A | 7/2015 |
| CN | 204547744 U | 8/2015 |
| DE | 10 2004 006 730 A1 | 8/2004 |
| DE | 10 2011 085 750 A1 | 5/2012 |
| DE | 102014115377 A1 | 4/2015 |
| JP | H09275664 A | 10/1997 |
| JP | 2006325367 A | 11/2006 |
| JP | 2010125954 A | 6/2010 |
| JP | 2012126191 A | 7/2012 |
| JP | 2014110705 A | 6/2014 |
| JP | 2015506661 A | 3/2015 |
| JP | 2015112943 A | 6/2015 |
| KR | 20080054405 | 6/2008 |
| KR | 20150028931 A | 3/2015 |
| WO | WO2013110677 A2 | 8/2013 |
| WO | WO2015087743 A1 | 6/2015 |

* cited by examiner

THERMAL MANAGEMENT SYSTEM FOR AN ELECTRIC DRIVE SYSTEM, PREFERABLY FOR A VEHICLE

The disclosure concerns a thermal management system for an electrical drive system, preferably for a vehicle, in which the electrical drive comprises an electric motor and power electronics, wherein the electric motor and the power electronics are incorporated within a cooling circuit and are cooled by a coolant circulating in the cooling circuit, wherein the coolant is circulated by a coolant pump.

BACKGROUND

From DE 10 2004 006 730 A1 and DE 10 2011 085 750 A1, methods for detecting damage to a coupling are known, with which in particular the temperature generation in the coupling is considered to apply protective measures in the event of excessive temperatures. The actuator system comprising the coupling, which contains an electric motor and power electronics that actuate the electric motor, comprises a coolant circuit, which in particular cools the power electronics. In this case, the coolant circuit is integrated within a cooling cover of the power output stage, wherein the coolant circuit is designed to cool a plurality of power output stages of the power electronics independently of each other. This is carried out by dividing the coolant circuit into a plurality of parallel paths.

In this case, the proposed cooling system is built into the cooling cover, so that the cooling of the power modules or other components of the actuator system cannot be altered or varied.

SUMMARY OF THE INVENTION

It is an object of the disclosure to specify a thermal management system for an electrical drive system, with which the cooling means enables variable cooling of individual components.

According to the disclosure, the electric motor and the power electronics each are in spatial contact with a cooling unit, wherein the cooling units of the electric motor and the power electronics are disposed in parallel with each other and an electrically controlled coolant distributor comprising two outputs is positioned between the coolant pump and the cooling units, wherein in each case an output leads to the cooling unit for the electric motor or to the cooling unit for the power electronics, and the outputs of the cooling units are merged in a channel and fed back to the coolant pump. This has the advantage that owing to the delivery of coolant being divided into parallel branches, continuous power to the electrical drive system is increased by the selective cooling of the power electronics and the electric motor. Improved overall efficiency of the electrical drive system at partial load points is achieved by thermal operating point adjustment of the power electronics and electric motor components. Moreover, enhanced short-term performance of the electrical drive system is possible by thermal preconditioning of the power electronics and electric motor components to provide a larger temperature difference. The service life of the components is increased by the demand-led cooling of the power electronics and the electric motor. Said thermal management system also provides advantages with the integration of the electrical drive system that is equipped in this way, because it preferably only comprises one coolant input and one coolant output from and to the coolant pump. This reduces the cost of integration for the manufacturer of the vehicle. By exploiting the heat loss in the interior of the vehicle, air conditioning of the vehicle interior is possible, which results in comfort advantages in the vehicle.

Advantageously, an electrically operated valve for controlling a volumetric flow of the coolant to the cooling unit for the electric motor and/or to the cooling unit for the power electronics is connected upstream of the outputs in the coolant distributor. Using an electrically operated valve of such a type, it is possible to regulate the volumetric flow between the power electronics and the electric motor cooling according to the demand.

In one embodiment, the electrically operated valve is embodied as a continuously regulated mechanical aperture. Because said mechanical aperture is continuously adjustable, the volumetric flow can be arbitrarily varied at each output.

In one embodiment, a control range of the valve lies between 0 and 100% of the volumetric flow of the coolant per output. This enables it to be ensured that the entire volumetric flow only flows through one output to the cooling unit for the electric motor or to the cooling unit for the power electronics and that the other output is free of coolant.

In one development, a control strategy for the volumetric flow is stored as software in a computing unit of the power electronics, wherein an electrical end stage for regulating the valve of the coolant distributor is disposed in the power electronics. Thus, the computer technology in the power electronics itself is used to actuate the valve. This is a very economical solution, because further electronic units can be omitted.

In one version, at an output of the coolant unit of the power electronics or at an output of the cooling unit for the electric motor, a changeover valve is positioned that on the one hand is connected to a coolant pump and on the other hand is fed to an input of the cooling unit for the electric motor or the input of the cooling unit for the power electronics. As a result, it is very easily possible when required to implement a series circuit from the parallel circuit of the cooling elements of the power electronics and the electric motor.

Advantageously, the changeover valve is electromechanically actuated. The actuation of the changeover valve is also carried out in this case by means of the power electronics, which is a particularly cost-effective implementation.

In one embodiment, a multiway valve is disposed in the merged outputs of the cooling units of the power electronics and the electric motor that opens or closes a coolant bypass to a further cooling unit for a vehicle assembly. The proposed thermal management system can thus be expanded without problems, so that other components of the vehicle, such as for example a high voltage battery, are incorporated, which results in the battery being brought up to an optimum operating temperature faster.

In one embodiment, the coolant pump is pressure-regulated. This is necessary to compensate for pressure losses in different system states of the thermal management system. Such different pressure losses arise during a changeover from serial to parallel operation of the coolant circuit or vice versa. To reduce the total system losses, the pumping power of the coolant pump can be reduced in different system states.

One development of the disclosure concerns a hybrid module with power electronics and an electric motor, within which a thermal management system is integrated. With a hybrid module, the thermal management system is embodied according to at least one of features described in this intellectual property application.

BRIEF SUMMARY OF THE DRAWINGS

The disclosure permits numerous embodiments. Some of these will be described in detail using the figures represented in the drawing.

In the figures.

DETAILED DESCRIPTION

Figure 1:
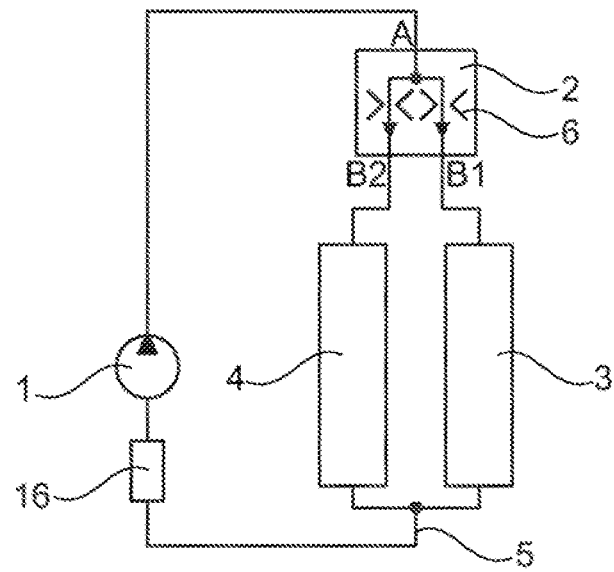
FIG. 1 shows a first exemplary embodiment of the thermal management system according to the disclosure.

Identical features are characterized by identical reference characters.

In FIG. 1, a first exemplary embodiment of the thermal management system according to the disclosure is represented, as used in electrical drive systems or electrical actuators. FIG. 1 shows a coolant circuit with a controllable coolant pump 1, which leads to a coolant distributor implemented as a volumetric flow divider 2. The volumetric flow divider 2 comprises an input A and two outputs B1 and B2. The output B1 leads to a cooling unit 3 for an electric motor, whereas the output B2 leads to a cooling unit 4 for the power electronics. The outputs C1, C2 of the cooling units 3, 4 for the electric motor and the power electronics are merged, so that only one channel 5 is fed back via a vehicle radiator 16 to the coolant pump 1. The cooling units 3, 4 absorb the heat output by the power electronics and the electric motor, whereas the vehicle radiator 16 outputs heat losses to the surroundings.

A multiway valve 6 that is disposed within the volumetric flow divider 2 regulates the volumetric flow of the coolant between the cooling unit 4 for the power electronics and the cooling unit 3 for the electric motor according to the demand. In this case, the multiway valve 6 is embodied as an electromechanical valve that is continuously controllable. The volumetric flow is adjusted in the multiway valve 6 by means of mechanical apertures, wherein the control range extends from 0 to 100% of the volumetric flow per output B1, B2 of the volumetric flow divider 2. This enables the shutting of an output B1, B2, so that the entire volumetric flow of the coolant is passed via only one of the outputs B1, B2 and so only the power electronics or only the electric motor can be cooled.

Figure 5:
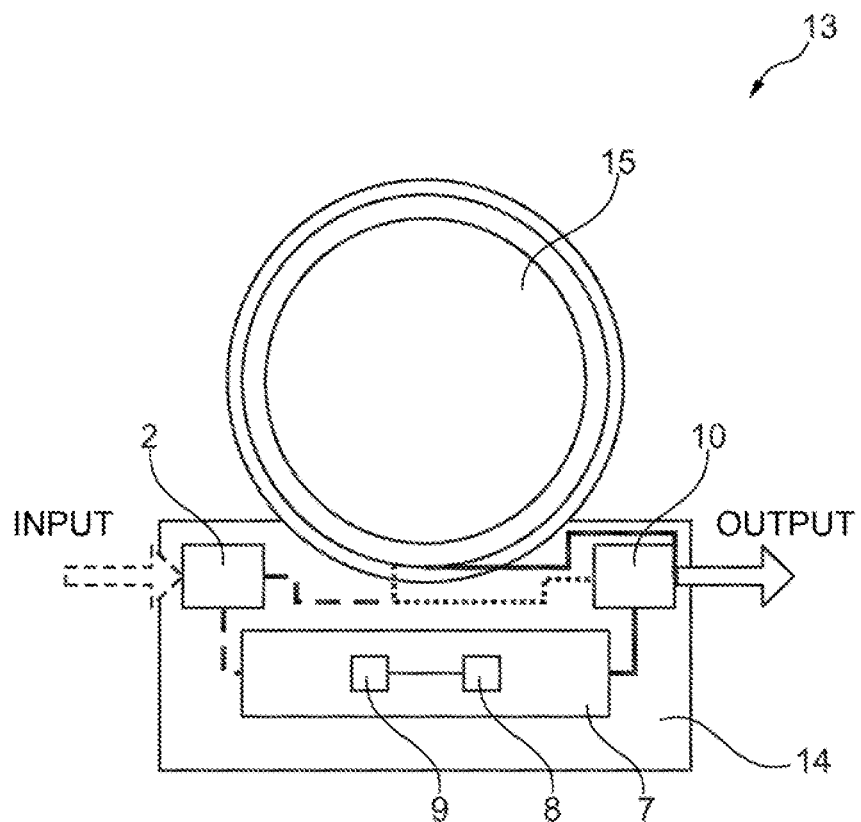
FIG. 5 shows an exemplary embodiment of a hybrid module according to the disclosure.

In this case, the electrical actuation of the volumetric flow divider 2 is carried out by means of the power electronics 7, in which case the control strategy for the thermal management system is placed in the software of a computing unit 8. Only an electrical end stage 9 is additionally necessary in the power electronics 7 in order to control the multiway valve 2 (FIG. 5). The control of the volumetric flow is carried out here depending on a current load point of the electrical drive train. In this case, certain prediction algorithms, i.e. a future behavior of the thermal management system, and setting parameters are taken into account, such as for example a Normal, Eco or Sport operating mode of a vehicle.

Figure 2:
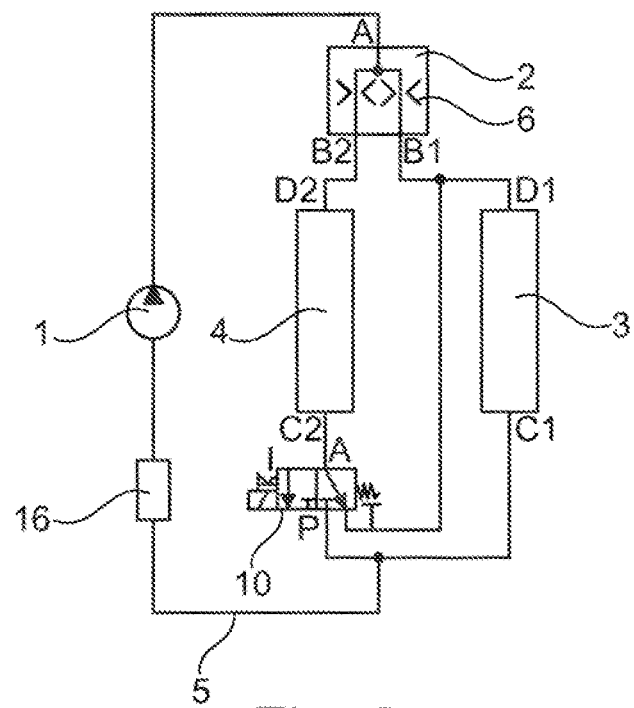
FIG. 2 shows a second exemplary embodiment of the thermal management system according to the disclosure.

In FIG. 2, a second exemplary embodiment of the thermal management system according to the disclosure is represented, with which in addition to the version represented in FIG. 1 a changeover valve 10 is disposed in the cooling circuit. The changeover valve 10 is connected to the output C2 of the cooling unit 4 for the power electronics and is embodied as a 3:2-valve, wherein three connections are provided and two switching states can be implemented. The switching states are likewise implemented on an electromechanical basis. The output T of the changeover valve 10 leads to an input D1 of the cooling unit 3 for the electric motor. The output P of the changeover valve 10 is in turn connected to the output C1 of the cooling unit 3 for the electric motor to the channel 5 and is fed back to the coolant pump 1. Because of said design, a serial circuit can be produced from the parallel circuit of the cooling units 3, 4.

It is however also conceivable that the additional changeover valve 10 is alternatively disposed at the output C1 of the cooling unit 3 for the electric motor, wherein the connection T is fed to the input D2 of the cooling unit 4 for the power electronics.

Figure 3:
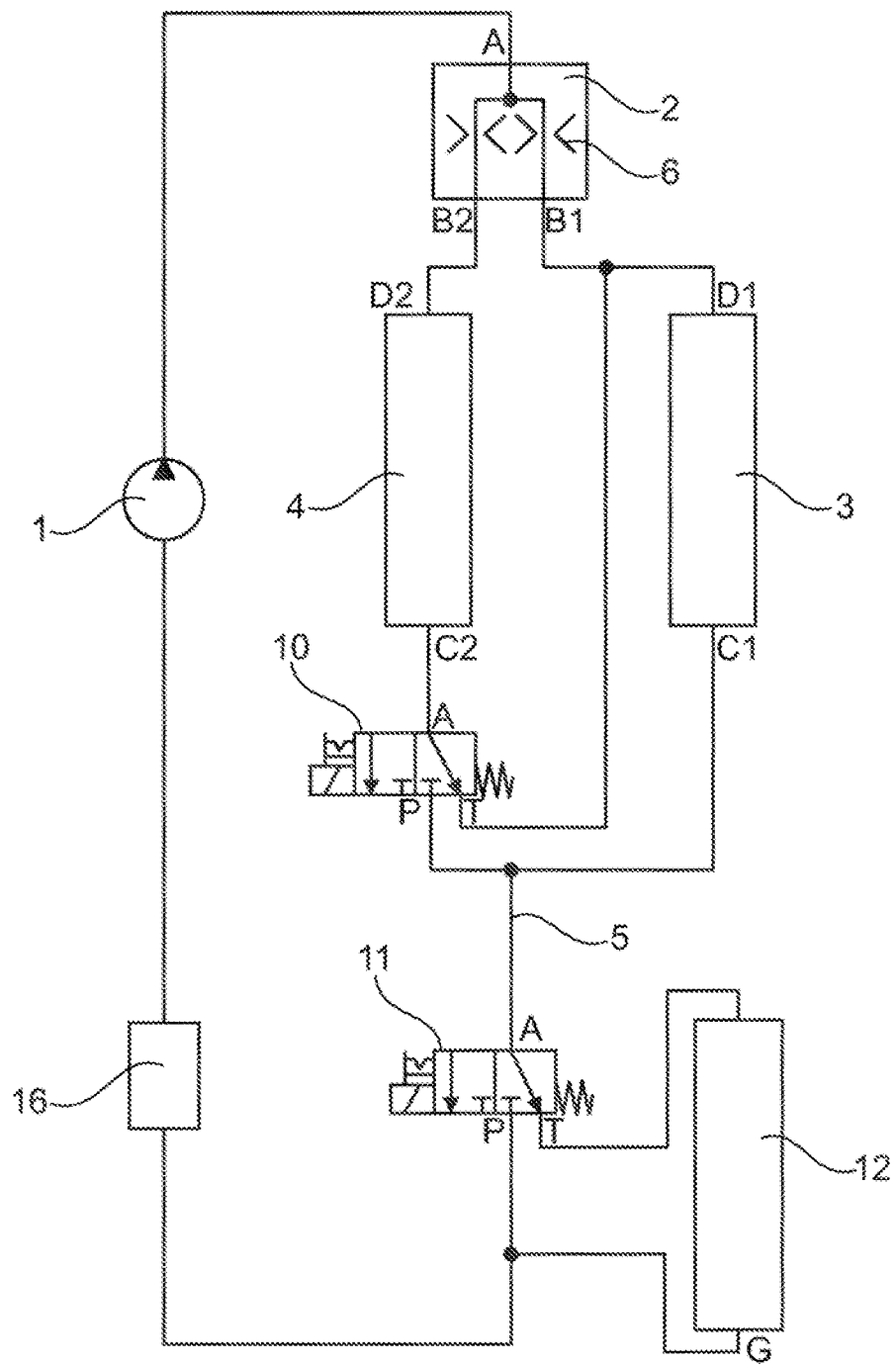
FIG. 3 shows a third exemplary embodiment of the thermal management system according to the disclosure.

FIG. 3 shows a further exemplary embodiment of the thermal management system according to the disclosure, with which thermal conditioning of other vehicle assemblies is possible. A further changeover valve 11 is disposed at the merged channel 5 of the outputs P, C1 of the changeover valve 10 and the cooling unit 3 for the electric motor, leading with the output T thereof to a cooling unit 12 for a vehicle assembly, for example a high voltage battery, wherein the output G of the cooling unit 12 for the vehicle assembly is merged with the output P of the changeover valve 11 and in turn leads to the coolant pump 1.

As an alternative, the thermal management system can be extended by a heat exchange unit for heating the interior of the vehicle.

Figure 4:
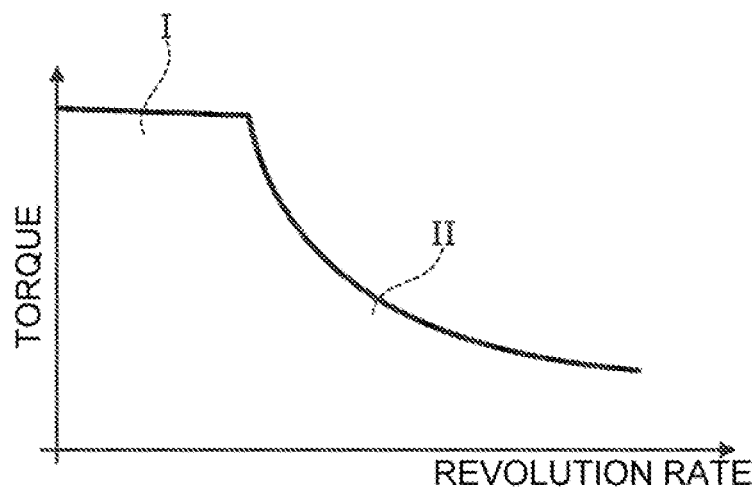
FIG. 4 shows a torque/revolution rate diagram of the electrical drive system.

In FIG. 4, a basic profile of torque and revolution rate of the electrical drive unit that is operated with the described thermal management system is represented in a diagram. The diagram shows how the available total volumetric flow of the coolant can be variably divided, so that it is optimal for the entire system. In the region I a large thermal load occurs for the inverter in the power electronics, so that in said region, i.e. at low revolution rates of the electrical drive unit, powerful cooling of the power electronics is purposeful. At higher revolution rates of the electrical drive unit, where the torque decreases, there is a large thermal load on the electric motor, so that at this point powerful cooling of the electric motor is necessary (region II). To set up a thermal management system of this type, a dynamic changeover between the described parallel and series circuit between cooling elements 3, 4 of the power electronics and the electric motor of the drive system is possible. The distribution of the total volumetric flow of the coolant thus depends on the respective operating point of the drive system, such as the torque and the revolution rate, whereby conclusions can be drawn regarding the performance of the drive system.

In FIG. 5, a hybrid module 13 is represented, in which the power electronics 7 are disposed in a housing 14, wherein the electric motor 15 is positioned on said housing 14. The thermal management system is only represented by the volumetric flow divider 2 and the changeover valve 10. With a hybrid module 13 of this type, the cooling circuits of the power electronics 7 and the electric motor 15 are spatially very close. The direct connection of the cooling circuits in the hybrid module 13 saves an expensive external connection, for example with hoses.

The proposed solution is provided for all electrical drive systems and actuators comprising power electronics and an electric motor.

REFERENCE CHARACTER LIST 1 coolant pump
2 volumetric flow divider
3 cooling unit
4 cooling unit
5 channel
6 multiway valve
7 power electronics
8 computing unit
9 end stage
10 changeover valve
11 changeover valve
12 cooling unit
13 hybrid module
14 housing
15 electric motor
16 vehicle radiator

What is claimed is:

1. A thermal management system for an electrical drive system for a vehicle, the electrical drive system comprising an electric motor and power electronics, the thermal management system comprising:
a cooling circuit, the electric motor and the power electronics being incorporated within the cooling circuit and being cooled by a coolant circulating in the cooling circuit, the cooling circuit including a coolant pump circulating the coolant, the cooling circuit including a first cooling unit in spatial contact with the electric motor, the cooling circuit including a second cooling unit in spatial contact with the power electronics, the first cooling unit and the second cooling unit being disposed in parallel with each other, the cooling circuit including an electrically controlled coolant distributor positioned between the coolant pump and the first cooling unit and between the coolant pump and the second cooling unit, the electrically controlled coolant distributor including a first output and a second output, the first output leading to the first cooling unit, the second output leading to the second cooling unit, the first cooling unit including a first cooling unit output, the second cooling unit including a second cooling unit output, the first cooling unit output and the second cooling unit output merging into a channel configured for feeding back to the coolant pump, wherein the cooling circuit includes a multiway valve disposed in the channel, the multiway valve configured for opening or closing a coolant bypass to a further cooling unit for a vehicle assembly.

2. The thermal management system as claimed in claim 1 wherein the cooling circuit includes an electrically operated valve configured for controlling a volumetric flow of the coolant to the first cooling unit or to the second cooling unit, the electrically operated valve being connected upstream of the first output and the second output in the electrically controlled coolant distributor.

3. The thermal management system as claimed in claim 2 wherein the electrically operated valve is a continuously controllable mechanical aperture.

4. The thermal management system as claimed in claim 3 wherein a control range of the electrically operated valve is between 0 and 100% of a volumetric flow of coolant per the first output or the second output.

5. The thermal management system as claimed in claim 1 wherein the cooling circuit including a changeover valve positioned at the first cooling unit output or the second cooling unit output, the changeover valve being connected to the coolant pump and to an input of the first cooling unit or an input the second cooling unit.

6. The thermal management system as claimed in claim 5 wherein the changeover valve is actuated electromechanically.

7. The thermal management system as claimed in claim 1 wherein the coolant pump is pressure-regulated.

8. A hybrid module comprising:
the thermal management system as claimed in claim 1;
the power electronics; and
the electric motor, the power electronics and the electric motor being integrated in the thermal management system.

9. The hybrid module as claimed in claim 8 wherein the cooling circuit includes an electrically operated valve configured for controlling a volumetric flow of the coolant to the first cooling unit or to the second cooling unit, the electrically operated valve being connected upstream of the first output and the second output in the electrically controlled coolant distributor, the power electronics including a computing unit programmed with a control strategy for the volumetric flow, the power electronics including an electrical end stage for regulating the electrically operated valve.

10. A thermal management system for an electrical drive system for a vehicle, the electrical drive system comprising an electric motor and power electronics, the thermal management system comprising:
a coolant pump configured for circulating a coolant;
a first cooling unit configured for cooling the electric motor via the coolant;
a second cooling unit configured for cooling the power electronics via the coolant; and
an electrically controlled coolant distributor configured for controlling flow of the coolant from the coolant pump to the first cooling unit and the second cooling unit, the first cooling unit and the second cooling unit arranged for receiving the coolant from the electrically controlled coolant distributor in parallel, the electrically controlled coolant distributor including a first output and a second output, the first output leading to the first cooling unit, the second output leading to the second cooling unit, the first cooling unit including a first cooling unit output, the second cooling unit including a second cooling unit output, the first cooling unit output and the second cooling unit output merging into a channel configured for feeding back to the coolant pump; and
an electrically operated valve configured for controlling a volumetric flow of the coolant to the first cooling unit and to the second cooling unit, the electrically operated valve configured for selectively shutting the first output and the second output so that an entire volumetric flow of the coolant is passed via only one of the first output and the second output so that coolant only flows through the first cooling unit or the second cooling.

11. The thermal management system as claimed in claim 10 further comprising a changeover valve including a valve input downstream from the first cooling unit output, the changeover valve including a first valve output connected to the coolant pump via the channel and a second valve output connected to an input of the second cooling unit.

12. A hybrid module comprising:
the thermal management system as claimed in claim 10;

the power electronics; and the electric motor, the electric motor and the power electronics being integrated in the thermal management system.

13. The hybrid module as claimed in claim 12 further comprising a housing, the power electronics being disposed in the housing, the electric motor being positioned on the housing.

14. The hybrid module as claimed in claim 12 wherein the cooling circuit includes an electrically operated valve configured for controlling a volumetric flow of the coolant to the first cooling unit or to the second cooling unit, the electrically operated valve being connected upstream of the first output and the second output in the electrically controlled coolant distributor, the power electronics including a computing unit programmed with a control strategy for the volumetric flow, the power electronics including an electrical end stage for regulating the electrically operated valve.

15. A thermal management system for an electrical drive system for a vehicle, the electrical drive system comprising an electric motor and power electronics, the thermal management system comprising:

a coolant pump configured for circulating a coolant;

a first cooling unit configured for cooling the electric motor via the coolant;

a second cooling unit configured for cooling the power electronics via the coolant and an electrically controlled coolant distributor configured for controlling flow of the coolant from the coolant pump to the first cooling unit and the second cooling unit, the first cooling unit and the second cooling unit arranged for receiving the coolant from the electrically controlled coolant distributor in parallel, the electrically controlled coolant distributor including a first output and a second output, the first output leading to the first cooling unit, the second output leading to the second cooling unit, the first cooling unit including a first cooling unit output, the second cooling unit including a second cooling unit output, the first cooling unit output and the second cooling unit output merging into a channel configured for feeding back to the coolant pump; and a changeover valve including a valve input downstream from the second cooling unit output, the changeover valve including a first valve output connected to the coolant pump via the channel and a second valve output connected to an input of the first cooling unit.

* * * * *